(12) United States Patent
Hui (10) Patent No.: US 11,681,095 B2
(45) Date of Patent: Jun. 20, 2023

(54) CHINESE KNOT-LIKE POROUS FIBER CORE ULTRAHIGH BIREFRINGENCE THZ OPTICAL FIBER

(71) Applicant: Xi'an University of Posts & Telecommunications, Xi'an (CN)

(72) Inventor: Zhanqiang Hui, Xi'an (CN)

(73) Assignee: Xi'an University of Posts & Telecommunications, Xi'an (CN)

( * ) Notice: Subject to any disclaimer, the term of this patent is extended or adjusted under 35 U.S.C. 154(b) by 0 days.

(21) Appl. No.: 17/824,160

(22) Filed: May 25, 2022

(65) Prior Publication Data

US 2022/0413209 A1 Dec. 29, 2022

(30) Foreign Application Priority Data

Jun. 29, 2021 (CN) .................. 202110722461.X (51) Int. Cl.
*G02B 6/02* (2006.01)
(52) U.S. Cl.
CPC ..... *G02B 6/02366* (2013.01); *G02B 6/02042* (2013.01)
(58) Field of Classification Search
CPC ............ G02B 6/02314; G02B 6/02319; G02B 6/02295; G02B 6/02366; G02B 6/02338
See application file for complete search history.

(56) References Cited

U.S. PATENT DOCUMENTS 8,958,676 B2 * 2/2015 Geernaert .......... G01D 5/35316
385/125

FOREIGN PATENT DOCUMENTS

| CN | 106707405 | A | * | 5/2017 | ........ G02B 6/02042 |
| CN | 109143462 | A | * | 1/2019 | ............ G02B 1/005 |
| CN | 111999798 | A | * | 11/2020 | |
| CN | 112505824 | A | * | 3/2021 | |
| CN | 113740957 | A | * | 12/2021 | |

* cited by examiner

*Primary Examiner* — Chris H Chu
(74) *Attorney, Agent, or Firm* — John Maldjian; Stevens & Lee PC (57) ABSTRACT

Disclosed is a Chinese knot-like porous fiber core ultra-high birefringence THz optical fiber. The optical fiber comprises a substrate, claddings and fiber cores, wherein the claddings and the fiber cores are arranged in the substrate, and the fiber cores are embedded in the centers of the claddings; and the fiber core comprises a first fiber core region, a second fiber core region and a third fiber core region, the center of the first fiber core region 4 serves as the origin of coordinates, and the first fiber core region 4 is composed of six regular hexagon units with overlapped boundaries in the x-axis direction. In the present disclosure, the fiber core comprises a first fiber core region, a second fiber core region and a third fiber core region, and the three regions jointly form a fiber core region of a Chinese knot-like porous fiber core.

14 Claims, 8 Drawing Sheets

CHINESE KNOT-LIKE POROUS FIBER CORE ULTRAHIGH BIREFRINGENCE THZ OPTICAL FIBER

CROSS REFERENCE TO RELATED APPLICATION

This patent application claims the benefit and priority of Chinese Patent Application No. 202110722461.X, filed on Jun. 29, 2021, which is incorporated herein by reference in its entirety.

BACKGROUND

The present disclosure relates to the technical field of optical fiber communication, in particular to a Chinese knot-like porous fiber core ultrahigh birefringence THz optical fiber.

The research found that structural circular symmetry of claddings and fiber cores of the photonic crystal fiber (PCF) is broken by changing the sizes, shapes, or arrangement modes of air holes in two polarization directions of the optical fiber. The purpose of regulating and controlling the refractive index distribution characteristics of the optical fiber is achieved. Due to the fact that propagation constants in the two polarization directions are different, when mode degeneracy between the two polarization states cannot occur, a high birefringence curve that varies with frequency can be obtained. The porous core terahertz (THz) PCF is a special optical fiber, and is particularly suitable for application in the fields of THz sensing, biomedical imaging, time domain spectroscopy, DNA hybridization and cancer detection, as well as the field of THz communication. Unlike a traditional THz transmission line, the PCF can provide high birefringence and adjustable dispersion characteristics in the THz range.

The method for realizing the high birefringence characteristic of the THz PCF by breaking the structural symmetry of the optical fiber can be divided into three modes: (1) the overall asymmetry of the optical fiber is improved by changing the shape and arrangement of air holes in claddings; (2) the overall asymmetry of the optical fiber is improved by changing the shape or arrangement of air holes in fiber core regions; and (3) the overall asymmetry of the optical fiber is improved by simultaneously changing the structures and arrangement of air holes in claddings and fiber core regions. The research found that at 1 THz, the Abdur Razzak research group provides two kinds of optical fibers based on a Kagome-shaped cladding and groove fiber core structure, the high birefringence values are 0.097 and 0.082 respectively, and the effective material absorption loss is smaller than 0.06 cm$^{-1}$. Habib proposes an optical fiber based on a triangular lattice cladding and groove core structure, and the birefringence value reaches 0.096 at 1.5 THz. Islam proposes a fiber core formed by combining elliptical air holes of different sizes, the birefringence of the optical fiber at 1 THz is 0.08, and the effective material loss is less than 0.07 cm$^{-1}$. However, researches at 3 THz are relatively few, and the obtained birefringence values are low. For example, five-layer circular air hole triangular lattice cladding and small round hole fiber core structure proposed by Wu has a birefringence value of 0.04 near 3 THz. For the triangular lattice cladding and elliptical fiber core structure proposed by Yakasai, the birefringence reaches 0.08 at 3 THz, and the effective material absorption loss is 0.03 cm$^{-1}$.

Therefore, the existing high-birefringence THz PCF has the problems advantages that the birefringence value is low, and high birefringence and low loss cannot be obtained simultaneously. Realization of a THz PCF with high birefringence, low loss and flat dispersion is still a challenge in the field of practical engineering application. For transmission of THz waves, reduction of confinement loss and improvement of birefringence have important engineering practical values, but the birefringence and loss characteristics of the THz optical fiber in the prior art are not ideal.

SUMMARY

Embodiments in accordance with the present invention, provide a Chinese knot-like porous fiber core ultra-high birefringence THz optical fiber, comprising a substrate, claddings and fiber cores;

the claddings and the fiber cores are arranged in the substrate, and the fiber cores are embedded in the centers of the claddings; the fiber core comprises a first fiber core region, a second fiber core region and a third fiber core region;

the center of the first fiber core region serves as the origin of coordinates, and the first fiber core region is composed of six regular hexagon units with overlapped boundaries in the x-axis direction;

two regular hexagon units with overlapped boundaries are introduced in the positive direction and the negative direction of the y axis respectively, and the vertexes are overlapped with the upper vertexes and the lower vertexes of the two regular hexagon units in the middle of the first fiber core region respectively; the second fiber core region is formed by two regular hexagon units with overlapped boundaries respectively introduced in the positive direction and the negative direction of the y axis and two regular hexagon units in the middle of the first fiber core region;

the regular hexagon unit is a regular hexagon area defined by six first circular air holes; seven first circular air holes are respectively introduced in the positive direction and the negative direction of the y-axis to form the third fiber core region, and the six first circular air holes in the middle of the third fiber core region are overlapped with the six first circular air holes in the y-axis of the second fiber core region;

the first fiber core region, the second fiber core region and the third fiber core region jointly form a Chinese knot-like porous fiber core region.

Further, the cladding is formed by arranging second circular air holes according to triangular lattices; the innermost layer is composed of six second circular air holes, and the second layer, the third layer, the fourth layer, the fifth layer and the sixth layer are respectively composed of twelve, eighteen, twenty-four, thirty and thirty second circular air holes.

Further, the radius R of the second circular air hole is 45 μm~49 μm.

Further, the distance Λ between the circle centers of every two adjacent second circular air holes is 100 μm~104 μm.

Further, the radius r of the first circular air hole is 1 μm~3 μm.

Further, the distance d between the circle centers of every two adjacent first circular air holes is 5 μm~9 μm.

Further, the distance L between the centers of every two adjacent regular hexagon units is $\sqrt{3}d$.

Further, the substrate is made of a cyclic olefin copolymer COC material.

Though the technical schemes provided by the embodiments of the present disclosure, the optical fiber has the following beneficial effects: in the present disclosure, the claddings and the fiber cores are arranged in the substrate, and the fiber cores are embedded in the centers of the claddings; the fiber core comprises the first fiber core region, the second fiber core region and the third fiber core region, and the three regions jointly form a fiber core region of a Chinese knot-like porous fiber core optical fiber. Therefore, due to the asymmetric arrangement of the porous core structure, the symmetry of the fiber core structure is broken, and the confinement loss of THz waves is reduced by the microstructure fiber core, so that the birefringence of the THz optical fiber is improved, the confinement loss is reduced, and the characteristic of adjustable dispersion is also met. Then, in the optical fiber, the claddings of the THz optical fiber are formed by arranging typical circular air holes according to triangular lattices, the cladding structure breaks the symmetry of the cross section of the optical fiber and is combined with the asymmetrically arranged fiber core structure, so that the birefringence of the THz optical fiber is further improved, and the confinement loss is further reduced. In addition, the THz optical fiber provided by the present disclosure has a birefringence change range of 0.08 to 0.0966 in a frequency range of 2 THz to 4.5 THz. The ultra-high birefringence of 0.0966 is obtained at the working frequency of 3.2 THz. The confinement loss is less than 0.0008675 dB/cm in the whole working frequency range and two orders of magnitude less than the confinement loss of previously designed optical fiber, and the effective material absorption loss is less than 1 $cm^{-1}$. The proposed structure represents extremely low near-zero flat dispersion of +/−0.125 ps/THz/cm in the frequency range of 2.3-4.5 THz.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

Figure 1:
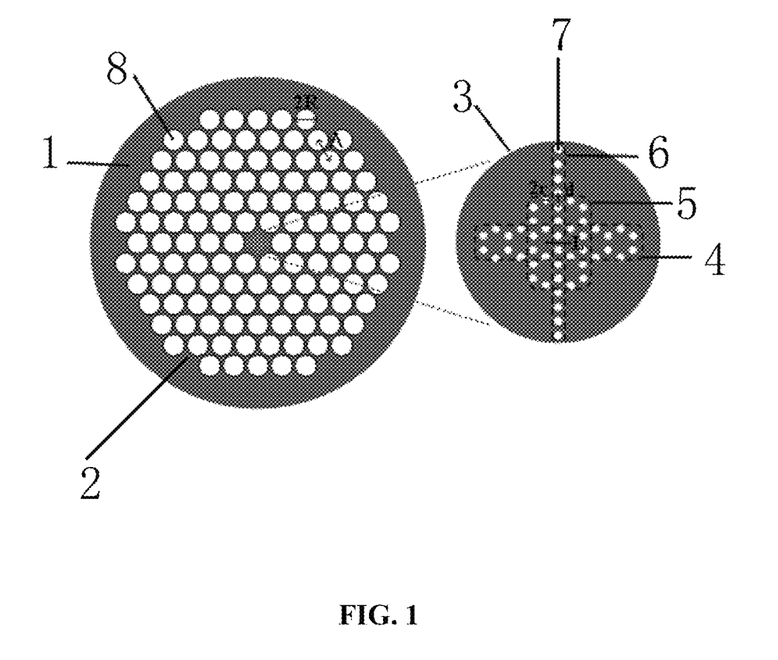
FIG. 1 is a cross-section structural schematic diagram of a Chinese knot-like porous fiber core ultrahigh birefringence THz optical fiber provided by the present disclosure.

REFERENCE SIGNS IN THE ATTACHED FIGURES 1, substrate; 2, cladding; 3, fiber core; 4, first fiber core region; 5, second fiber core region; 6, third fiber core region; 7, first circular air hole; and 8, second circular air hole.

DETAILED DESCRIPTION OF THE EMBODIMENTS

Unless otherwise defined, all technical and scientific terms used herein shall have the same meanings as commonly understood by those skilled in the art to which the present disclosure belongs. The terms used in the specification of the present disclosure are merely intended to describe specific embodiments but not intended to constitute any limitation on the present disclosure.

In order to make the purpose, technical scheme, and advantages of the present disclosure clearer, the technical scheme of the present disclosure is described in detail as follows in conjunction with the attached figures.

FIG. 1 is a cross-section structural schematic diagram of a Chinese knot-like porous fiber core ultrahigh birefringence THz optical fiber provided by the present disclosure. Referring to FIG. 1, the Chinese knot-like porous fiber core ultrahigh birefringence THz optical fiber comprises a substrate 1, claddings 2 and fiber cores 3, wherein the claddings 2 and the fiber cores 3 are arranged in the substrate 1, and the fiber cores 3 are embedded in the centers of the claddings 2; the fiber core 3 comprises a first fiber core region 4, a second fiber core region 5 and a third fiber core region 6; the center of the first fiber core region 4 serves as the origin of coordinates, and the first fiber core region 4 is composed of six regular hexagon units with overlapped boundaries in the x-axis direction; two regular hexagon units with overlapped boundaries are introduced in the positive direction and the negative direction of the y axis respectively, and the vertexes are overlapped with the upper vertexes and the lower vertexes of the two regular hexagon units in the middle of the first fiber core region 4 respectively; the second fiber core region 5 is formed by two regular hexagon units with overlapped boundaries respectively introduced in the positive direction and the negative direction of the y axis and two regular hexagon units in the middle of the first fiber core region 4. The regular hexagon unit is a regular hexagon area defined by six first circular air holes 7; seven first circular air holes 7 are respectively introduced in the positive direction and the negative direction of the y axis to form the third fiber core region 6, and the six first circular air holes 7 in the middle of the third fiber core region 6 are overlapped with the six first circular air holes 7 in the y-axis of the second fiber core region 5. The first fiber core region 4, the second fiber core region 5 and the third fiber core region 6 jointly form a Chinese knot-like porous fiber core region.

It needs to be noted that since the influence of the triangular lattices of the fiber cores on the characteristics of the optical waveguide mode is larger than that of the triangular lattices of the cladding, the anisotropic microstructure air holes are introduced into the fiber core region of the optical fiber, and excellent characteristics such as high birefringence and large mode field area can be obtained more easily. Therefore, in the present disclosure, the fiber core 3 is composed of a plurality of first circular air holes 7 and comprises a first fiber core region 4, a second fiber core region 5 and a third fiber core region 6, and all the parts are overlapped; the three regions jointly form a fiber core region of a Chinese knot-like porous fiber core. Therefore, due to the asymmetric arrangement of the porous core structure, the symmetry of the fiber core structure is broken, and the confinement loss of THz waves is reduced by the microstructure fiber core, so that the birefringence of the THz fiber is improved, the confinement loss is reduced, and the characteristic of adjustable dispersion is also met.

Further, the cladding 2 is formed by arranging second circular air holes 8 according to triangular lattices; the innermost layer is composed of six second circular air holes 8, and the second layer, the third layer, the fourth layer, the fifth layer and the sixth layer are respectively composed of twelve, eighteen, twenty-four, thirty and thirty second circular air holes 8.

It needs to be noted that the cladding 2 is arranged in a triangular lattice mode through the second circular air holes 8, and the number of the claddings 2 is determined to be six in consideration of birefringence, confinement loss characteristics and manufacturing difficulty of the optical fiber. Thus, the symmetry of the cross section of the optical fiber is broken through by the structure of the cladding 2, and the structure of the cladding 2 is combined with the microstructure of the fiber core 3, so that the birefringence of the THz optical fiber is further improved, and the confinement loss is reduced.

Further, the radius R of the second circular air hole 8 is 45 μm~49 μm.

Figure 2:
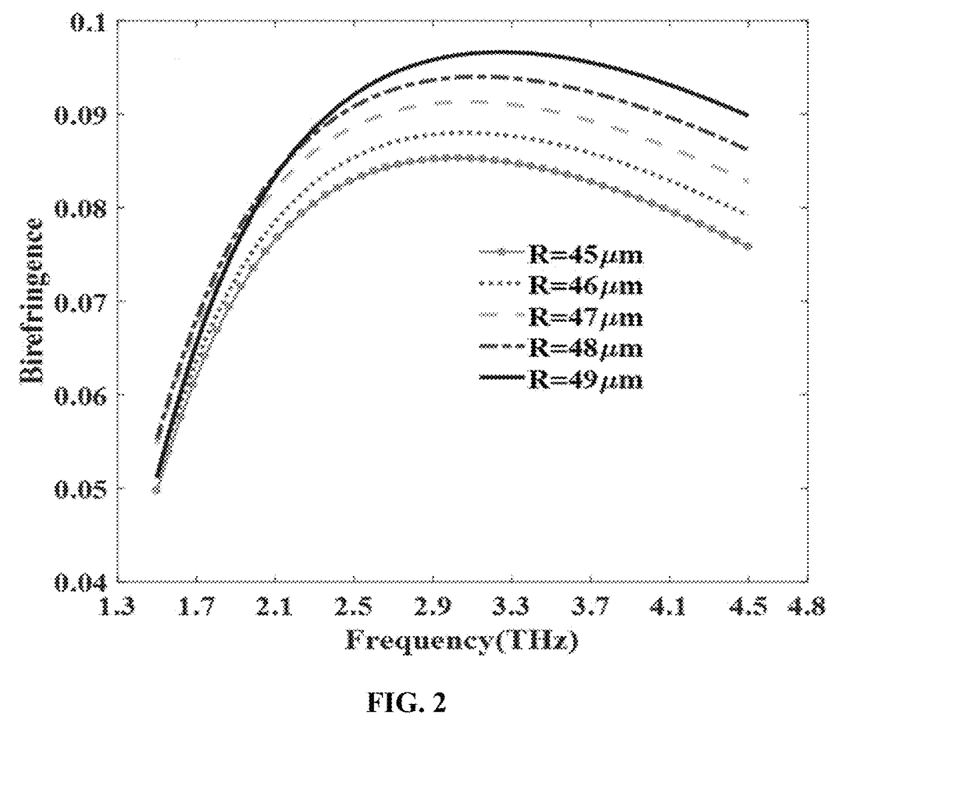
FIG. 2 is a curve chart of birefringence that varies with frequency under different radius parameters of the second circular air holes provided by the present disclosure.

It should be noted that FIG. 2 is a curve chart of birefringence that varies with frequency under different radius parameters of second circular air holes provided by the present disclosure. Referring to FIG. 2, the relation between the birefringence and the frequency is respectively calculated when the radii R of the second circular air holes 8 forming the cladding 2 are 45 μm, 46 μm, 47 μm, 48 μm and 49 μm. From the figure, it can be concluded that the birefringence value is the largest when R is selected to be 49 μm.

Further, the distance Λ between the circle centers of every two adjacent second circular air holes 8 is 100 μm~104 μm.

Figure 3:
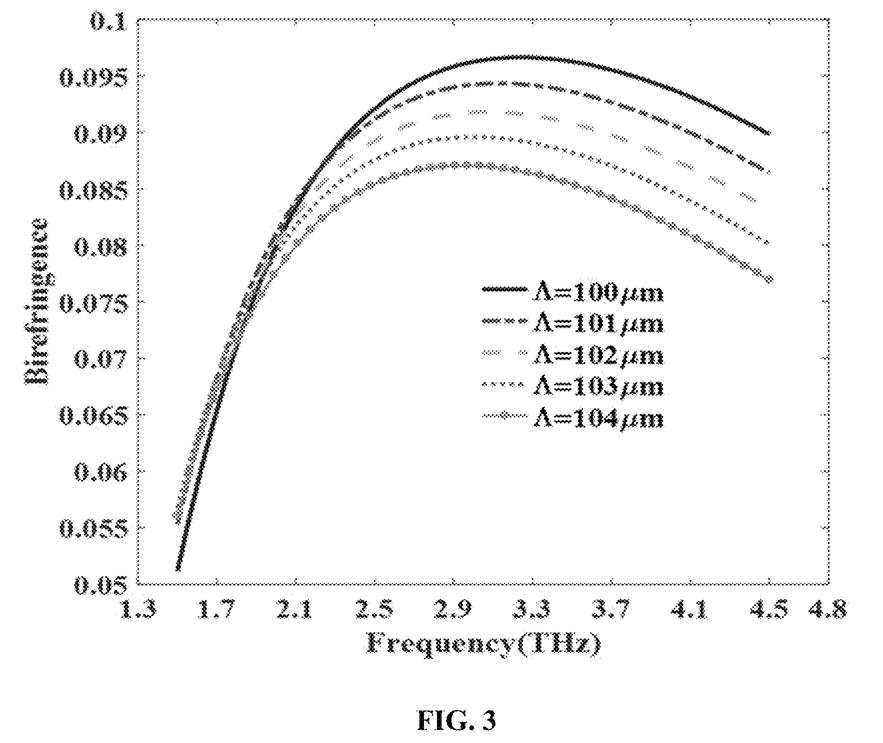
FIG. 3 is a curve chart of birefringence that varies with frequency under different distance parameters between the circle centers of every two adjacent second circular air holes provided by the present disclosure.

It should be noted that FIG. 3 is a curve chart of birefringence that varies with frequency under different distance parameters between the circle centers of every two adjacent second circular air holes provided by the present disclosure. Referring to FIG. 3, the relation between the birefringence and the frequency is respectively calculated when the distance Λ between the circle centers of every two adjacent second circular air holes 8 forming the cladding 2 are 100 μm, 101 μm, 102 μm, 103 μm and 104 μm. From the figure, it can be concluded that the birefringence value is the largest when A is selected to be 100 μm.

Further, the radius r of the first circular air hole 7 is 1 μm~3 μm.

Figure 4:
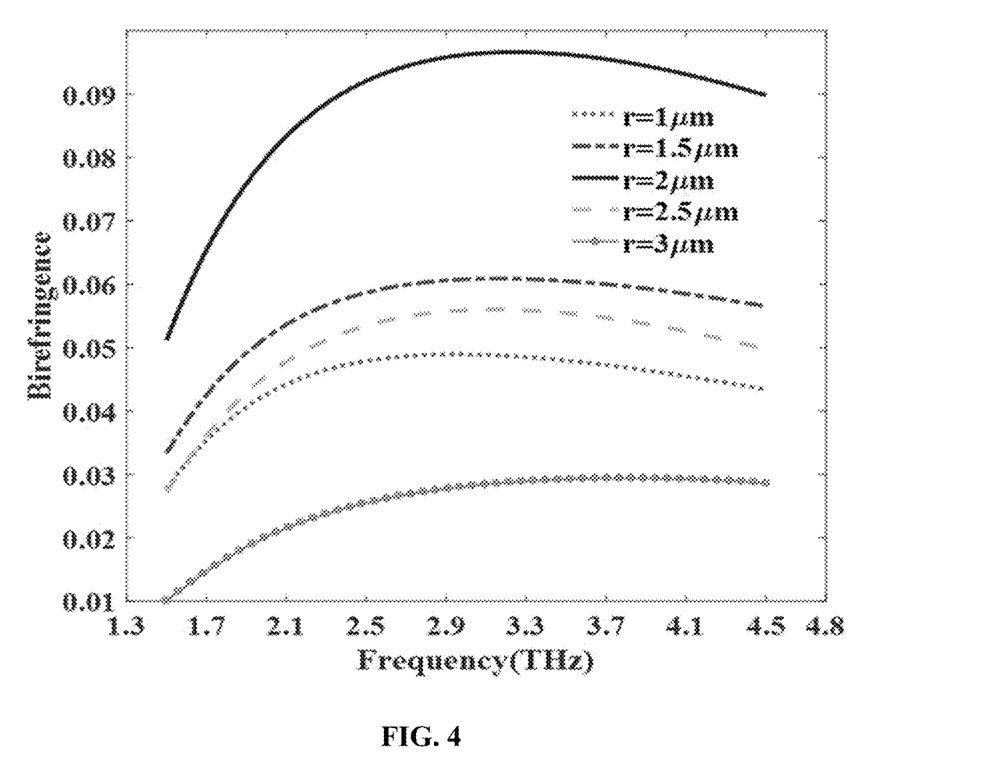
FIG. 4 is a curve chart of birefringence that varies with frequency under different radius parameters of the first circular air holes provided by the present disclosure.

It should be noted that FIG. 4 is a curve chart of birefringence that varies with frequency under different radius parameters of first circular air holes provided by the present disclosure. Referring to FIG. 4, the relation between the birefringence and the frequency is respectively calculated when the radii r of the first circular air holes 7 forming the cladding 3 are 1 μm, 1.5 μm, 2 μm, 2.5 μm and 3 μm. From the figure, it can be concluded that the birefringence value is the largest when r is selected to be 2 μm.

Further, the distance d between the circle centers of every two adjacent first circular air holes 7 is 5 μm~9 μm.

Figure 5:
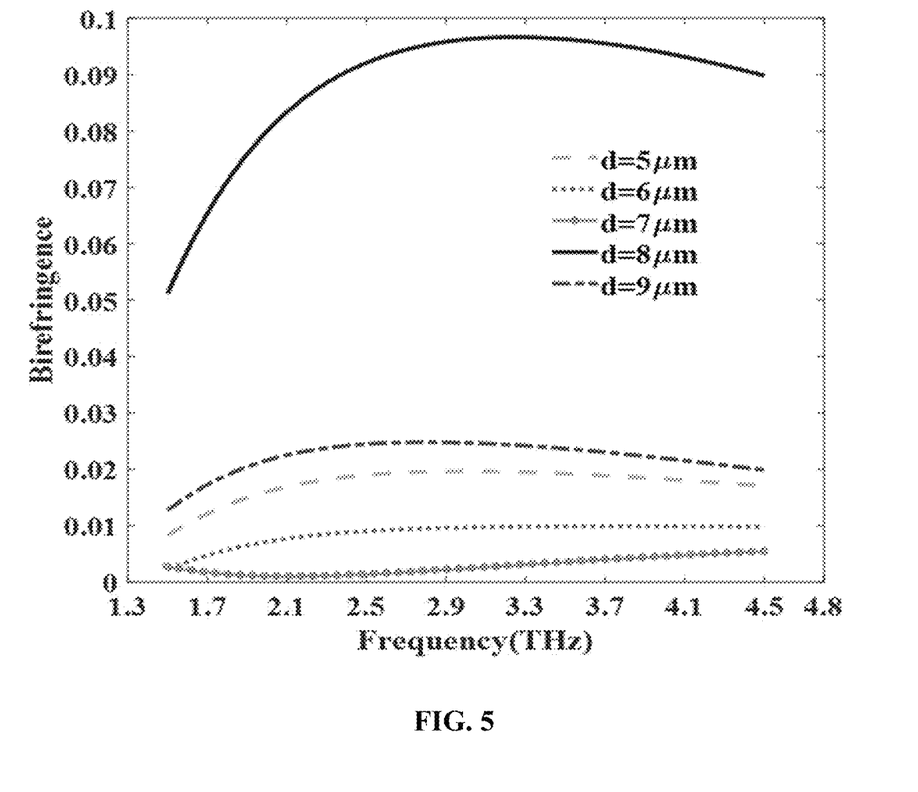
FIG. 5 is a curve chart of birefringence that varies with frequency under different distance parameters between the circle centers of every two adjacent first circular air holes provided by the present disclosure.

It should be noted that FIG. 5 is a curve chart of birefringence that varies with frequency under different distance parameters between the circle centers of every two adjacent first circular air holes provided by the present disclosure. Referring to FIG. 5, the relation between the birefringence and the frequency is respectively calculated when the distances d is 5 μm, 6 μm, 7 μm, 8 μm and 9 μm. From the figure, it can be concluded that the birefringence value is the largest when d is selected to be 8 μm.

Further, the distance L between the centers of every two adjacent regular hexagon units is $\sqrt{3}d$.

It needs to be noted that, referring to FIG. 5, the birefringence value is the largest when d is 8 μm. Therefore, when L is $\sqrt{3}d$ and also 13.856 μm, the birefringence value is the largest.

Further, the substrate 1 is made of a cyclic olefin copolymer COC material.

It needs to be noted that the cyclic olefin copolymer COC material is an amorphous high-molecular polymer. The optical fiber has a relatively stable refractive index of 1.52 in a range of 2-4.5 THz, and has a relatively low material body absorption coefficient $\alpha_{mat}$ of 1 $cm^{-1}$.

Figure 6:
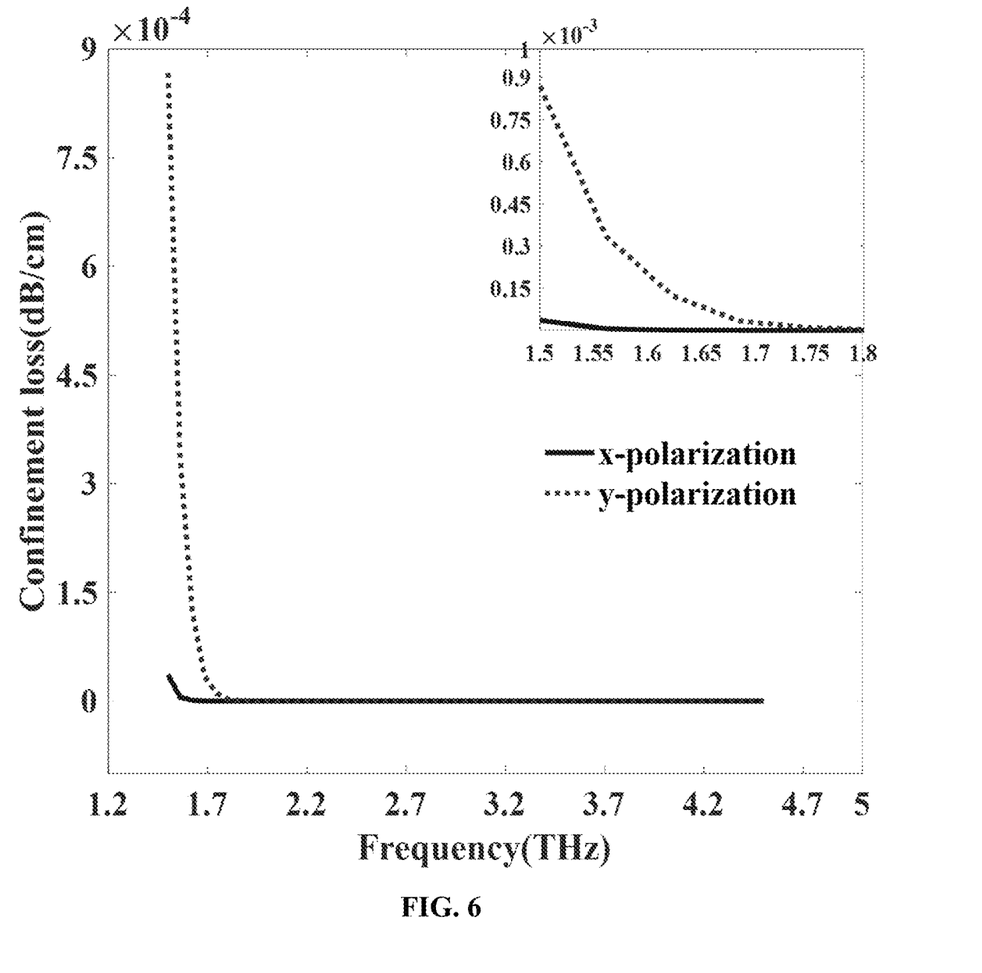
FIG. 6 is a curve of confinement loss that varies with frequency for a Chinese knot-like porous fiber core ultrahigh birefringence THz optical fiber provided by the present disclosure.

It further needs to be noted that FIG. 6 is a curve of confinement loss that varies with frequency for a Chinese knot-like porous fiber core ultrahigh birefringence THz optical fiber provided by the present disclosure. In the figure, the relation between the confinement loss and the frequency is calculated when the structure parameters of the optical fiber that R is 49 μm, Λ is 100 μm, r is 2 μm and d is 8 μm are set. From the figure, it can be concluded that when the optimized parameter values are selected, the maximum confinement loss of $TM_0$ polarization mode at 1.5 THz low-frequency position is 0.0008675 dB/cm, and the confinement loss of $TE_0$ polarization mode is 0.00003599 dB/cm. Broadband low-loss transmission is realized in the whole working frequency band.

Figure 7:
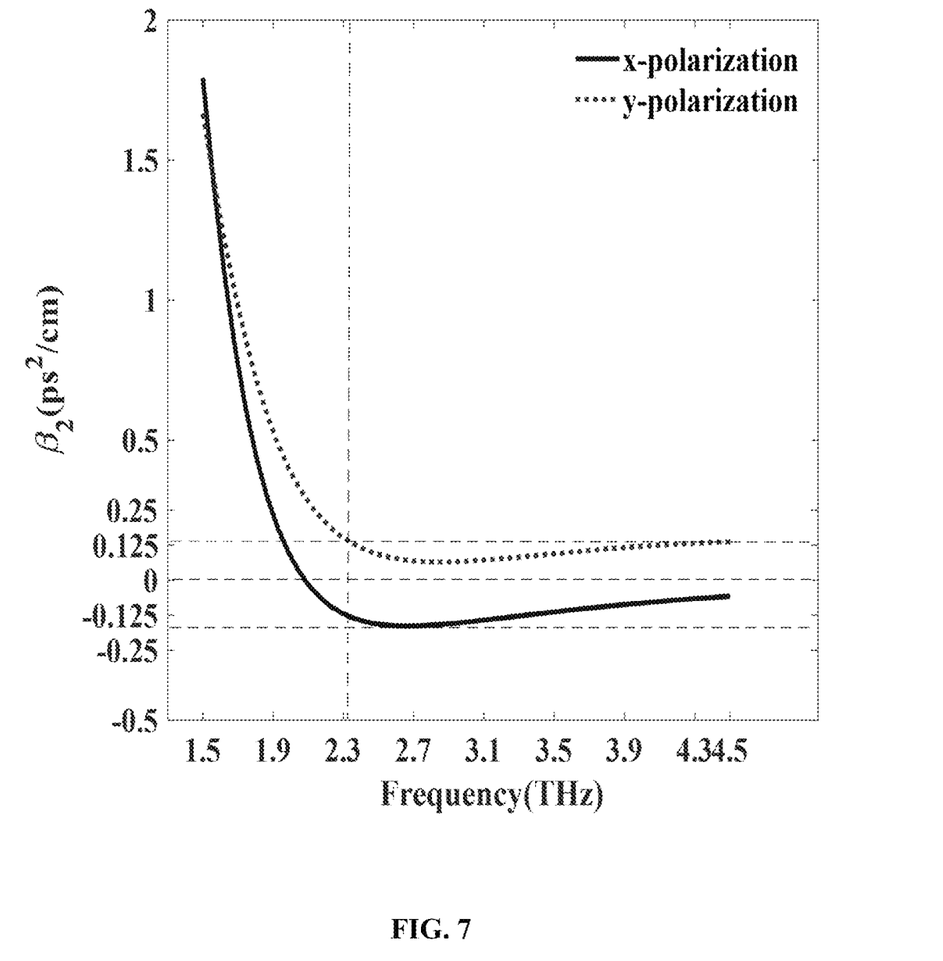
FIG. 7 is a waveguide dispersion curve chart of a Chinese knot-like porous fiber core ultrahigh birefringence THz optical fiber at 1.5 to 4.5 THz provided by the present disclosure.

Then, FIG. 7 is a waveguide dispersion curve chart of a Chinese knot-like porous fiber core ultrahigh birefringence THz optical fiber at 1.3 to 5 THz provided by the present disclosure. In FIG. 4, the waveguide dispersion curve of the proposed THz optical fiber at 1.5-4.5 THz after parameter optimization is calculated when the structure parameters of the optical fiber that R is 49 μm, Λ is 100 μm, r is 2 μm and d is 8 μm are set. From the figure, it can be concluded that, in a wide frequency range of 2.3-4.5 THz, low near-zero flat waveguide dispersion is always kept in a range of +/−0.125 ps/THz/cm, and efficient transmission of broadband THz waves is facilitated.

Figure 8:
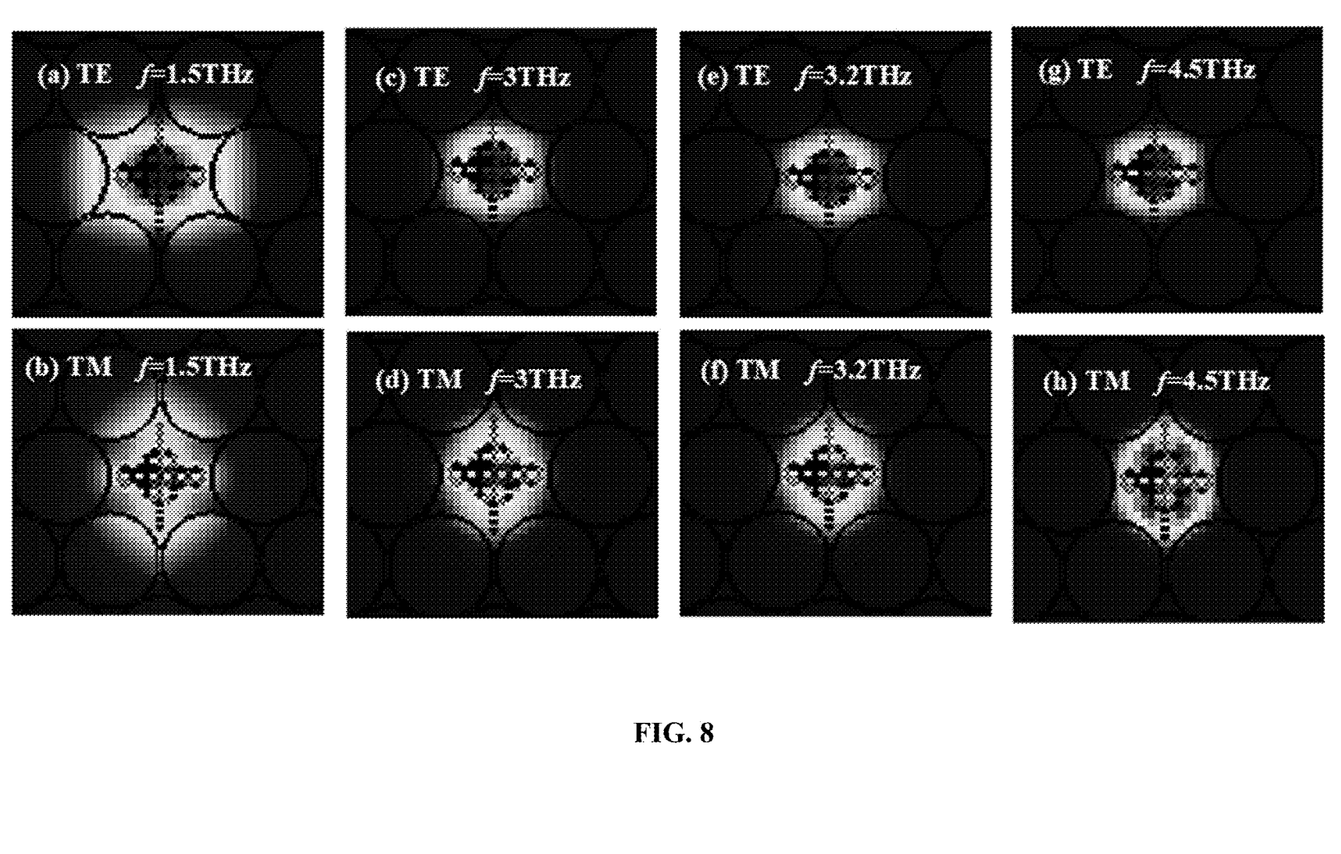
FIG. 8 is a mode field distribution diagram of TE polarization state and TM polarization state at 1.3 THz, 3 THz and 5 THz provided by present disclosure.

In addition, FIG. 8 is a mode field distribution diagram of $TE_0$ polarization state and $TM_0$ polarization state at 1.5 THz, 3 THz, 3.2 THz and 4.5 THz provided by present disclosure. When the structure parameters of the optical fiber that R is 49 μm, Λ is 100 μm, r is 2 μm and d is 8 μm are set, the mode field distributions of the two polarization states at 1.5 THz, 3 THz, 3.2 THz and 4.5 THz are achieved respectively. FIG. 8(a) indicates TE mode field distribution at 1.5 THz; FIG. 8(b) indicates TM mode field distribution at 1.5 THz; FIG. 8(c) indicates TE mode field distribution at 3 THz; FIG. 8(d) indicates TM mode field distribution at 3 THz; FIG. 8(e) indicates TE mode field distribution at 3.2 THz; FIG. 8(f) indicates TM mode field distribution at 3.2 THz; FIG. 8(g) indicates TE mode field distribution at 4.5 THz; and FIG. 8(h) indicates TM mode field distribution at 4.5 THz. The results show that the designed optical fiber works properly at the four frequencies.

The sequence numbers of the embodiments of the present disclosure are only used for description and do not represent advantages and disadvantages of the embodiments.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A Chinese knot-like porous fiber core ultra-high birefringence THz optical fiber, comprising a substrate, claddings and fiber core, wherein the claddings and the fiber core are arranged in the substrate, and the fiber core is embedded in the center of the claddings; the fiber core comprises a first fiber core region, a second fiber core region and a third fiber core region;

the center of the first fiber core region serves as the origin of coordinates, and the first fiber core region is composed of six regular hexagon units with overlapped boundaries in the $\chi$-axis direction;

two regular hexagon units with overlapped boundaries are introduced in the positive direction and the negative direction of the $\gamma$-axis respectively, and the vertexes are overlapped with the upper vertexes and the lower vertexes of the two regular hexagon units in the middle of the first fiber core region respectively; the second fiber core region is formed by two regular hexagon units with overlapped boundaries respectively introduced in the positive direction and the negative direction of the $\gamma$-axis and two regular hexagon units in the middle of the first fiber core region;

the regular hexagon unit is a regular hexagon area defined by six first circular air holes; seven first circular air holes are respectively introduced in the positive direction and the negative direction of the $\gamma$-axis to form the third fiber core region, and the six first circular air holes in the middle of the third fiber core region are overlapped with the six first circular air holes in the $\gamma$-axis of the second fiber core region; and the first fiber core region, the second fiber core region and the third fiber core region jointly form a Chinese knot-like porous fiber core region.

2. The Chinese knot-like porous fiber core ultra-high birefringence THz optical fiber according to claim 1, wherein the cladding is formed by arranging second circular air holes according to triangular lattices; the innermost layer is composed of six second circular air holes, and the second layer, the third layer, the fourth layer, the fifth layer and the sixth layer are respectively composed of twelve, eighteen, twenty-four, thirty and thirty second circular air holes.

3. The Chinese knot-like porous fiber core ultra-high birefringence THz optical fiber according to claim 2, wherein the radius R of the second circular air hole is 45 μm~49 μm.

4. The Chinese knot-like porous fiber core ultra-high birefringence THz optical fiber according to claim 3, wherein the distance A between the circle centers of every two adjacent second circular air holes is 100 μm~104 μm.

5. The Chinese knot-like porous fiber core ultra-high birefringence THz optical fiber according to claim 1, wherein the radius r of the first circular air hole is 1 μm~3 μm.

6. The Chinese knot-like porous fiber core ultra-high birefringence THz optical fiber according to claim 5, wherein the distance d between the circle centers of every two adjacent first circular air holes is 5 μm~9 μm.

7. The Chinese knot-like porous fiber core ultra-high birefringence THz optical fiber according to claim 6, wherein the distance L between the centers of every two adjacent regular hexagon units is $\sqrt{3}d$.

8. The Chinese knot-like porous fiber core ultra-high birefringence THz optical fiber according to claim 1, wherein the substrate is made of a cyclic olefin copolymer COC material.

9. The Chinese knot-like porous fiber core ultra-high birefringence THz optical fiber according to claim 2, wherein the substrate is made of a cyclic olefin copolymer COC material.

10. The Chinese knot-like porous fiber core ultra-high birefringence THz optical fiber according to claim 3, wherein the substrate is made of a cyclic olefin copolymer COC material.

11. The Chinese knot-like porous fiber core ultra-high birefringence THz optical fiber according to claim 4, wherein the substrate is made of a cyclic olefin copolymer COC material.

12. The Chinese knot-like porous fiber core ultra-high birefringence THz optical fiber according to claim 5, wherein the substrate is made of a cyclic olefin copolymer COC material.

13. The Chinese knot-like porous fiber core ultra-high birefringence THz optical fiber according to claim 6, wherein the substrate is made of a cyclic olefin copolymer COC material.

14. The Chinese knot-like porous fiber core ultra-high birefringence THz optical fiber according to claim 7, wherein the substrate is made of a cyclic olefin copolymer COC material.

* * * * *